(12) United States Patent
Watanabe et al.

(10) Patent No.: US 8,652,577 B2
(45) Date of Patent: Feb. 18, 2014

(54) METHOD OF MANUFACTURING CATHODE ACTIVE MATERIAL

(75) Inventors: Haruo Watanabe, Kanagawa (JP);
Tomoyo Ooyama, Fukushima (JP);
Hideto Azuma, Fukushima (JP);
Shigeru Fujita, Fukushima (JP)

(73) Assignee: Sony Corporation, Tokyo (JP)

( * ) Notice: Subject to any disclaimer, the term of this patent is extended or adjusted under 35 U.S.C. 154(b) by 543 days.

(21) Appl. No.: 12/366,397

(22) Filed: Feb. 5, 2009

(65) Prior Publication Data
US 2009/0200510 A1 Aug. 13, 2009

(30) Foreign Application Priority Data

Feb. 13, 2008 (JP) .................................. 2008-031344

(51) Int. Cl.
*B05D 3/02* (2006.01)
*B05D 3/00* (2006.01)
*B05D 7/14* (2006.01)

(52) U.S. Cl.
USPC ........... 427/314; 427/212; 427/215; 427/299; 427/318; 427/328; 427/331; 427/348; 427/372.2; 427/430.1; 427/435; 427/443.2

(58) Field of Classification Search
USPC .............. 252/500, 519.1, 212, 215, 299, 314, 252/318, 328, 331, 348, 372.2, 430.1, 435, 252/443.2
See application file for complete search history.

(56) References Cited

U.S. PATENT DOCUMENTS

| 6,372,385 | B1 | 4/2002 | Kweon et al. |
| 6,447,739 | B1 | 9/2002 | Krynitz et al. |
| 6,716,372 | B2 * | 4/2004 | Barker et al. ............ 429/231.95 |
| 6,984,469 | B2 * | 1/2006 | Kweon et al. ............ 429/231.95 |

FOREIGN PATENT DOCUMENTS

| JP | 08-138670 | 5/1996 |
| JP | 09-050810 | 2/1997 |
| JP | 10-233213 | 9/1998 |
| JP | 2000-123836 | 4/2000 |
| JP | 2000-260432 | 9/2000 |
| JP | 2001-028265 | 1/2001 |
| JP | 2002-502795 | 1/2002 |
| JP | 2002-164053 | 6/2002 |

* cited by examiner

*Primary Examiner* — Lorna M Douyon
*Assistant Examiner* — Amina Khan
(74) *Attorney, Agent, or Firm* — K&L Gates LLP (57) ABSTRACT

A method of manufacturing a cathode active material is provided. The method includes the step of precipitating step for providing a solution of a deposition component onto composite oxide particles including lithium Li and nickel Ni, removing a solvent from the solution on the composite oxide particles within a short time period, and precipitating the deposition component on surfaces of the composite oxide particles; and heating step for heating under an oxidation atmosphere the composite oxide particles with the deposition component precipitated on the surfaces.

22 Claims, 3 Drawing Sheets

METHOD OF MANUFACTURING CATHODE ACTIVE MATERIAL

CROSS REFERENCES TO RELATED APPLICATIONS

The present application claims priority to Japanese Patent Application JP 2008-031344 filed in the Japanese Patent Office on Feb. 13, 2008, the entire contents of which is being incorporated herein by reference.

BACKGROUND

The present application relates to a method of manufacturing a cathode active material, and more particularly, to a method of manufacturing a cathode active material having a composite oxide material containing lithium (Li) and nickel (Ni).

Recently, as portable devices such as a video camera and a laptop personal computer are widely used, small-sized high-capacity secondary batteries are highly demanded. In the past, a nickel-hydrogen battery or a nickel-cadmium battery containing an alkali electrolyte solution has been used as a secondary battery. However, since they have a low battery voltage of about 1.2 V, it was difficult to improve an energy density. For this reason, a lithium metal secondary battery which adopts lithium as an anode material has been proposed. It has been known that lithium has a lightest weight among single solid materials (its specific gravity is 0.534) and produces a significantly low voltage and a largest current amount per unit weight among metal anode materials.

However, in the secondary battery adopting lithium as an anode material, resin-like lithium (i.e., dendrite) is precipitated on a surface of the anode during a charge operation, and the dentrite grows as the charge/discharge cycle is repeated. This dentrite growth deteriorates a charge/discharge cycle characteristic of the secondary battery, and may, in a worst case, generate damages to a barrier membrane (separator) arranged to prevent contact between the positive and anodes and produce an internal short circuit. As a result, a battery may be fired and broken down.

For example, Japanese Patent Application Laid-open (JP-A) No. 62-90863 discloses another secondary battery which adopts a carbon material such as cokes as an anode and repeats the charge/discharge operation by doping and removing alkali metal ions. It was recognized that the aforementioned deterioration of the anode caused by the repeated charge/discharge operation could be prevented by adopting the secondary battery disclosed in the above-referenced patent document.

On the other hand, a cathode active material that can produce a high voltage has been studied and developed, and finally, an active material that can produce a battery voltage of about 4 V has been found and highlighted. It has been known that transition metal oxides including alkali metal or inorganic compounds such as transition metal chalcogen may be used as an active material. Among them, lithium transition metal composite oxides [$Li_xNiO_2$(0<x≤1.0) or $Li_xCoO_2$ (0<x≤1.0)] containing nickel or cobalt as a main composition are most prospective from the viewpoints of a high voltage, safety, and a long lifetime. Among them, a cathode active material containing lithium nickelate ($LiNiO_2$) as a main composition is expected to produce a relatively high voltage, a high charge current capacity, and a high energy density.

Currently, it is demanded to improve a capacity of a secondary battery which uses the lithium transition metal composite oxide as a cathode active material by modifying the lithium transition metal composite oxide containing nickel or cobalt as a main composition which is expected to produce a high charge current capacity and a high energy density. Also, it is demanded to improve charge/discharge efficiency of a secondary battery by modifying the lithium transition metal composite oxide.

In this regard, a method of reforming the cathode active material has been performed by coating other materials on surfaces of the composite oxide particles including lithium nickelate as a start material.

The aforementioned technology for reforming the cathode active material by coating the surface is necessary to provide a high coatability. In order to provide the high coatability, various techniques have been proposed. For example, in a so-called dry deposition method, the composite oxide particles and coating materials are mixed and then baked. In addition, in a so-called wet deposition method, the coating materials are deposited by a metal hydroxide having a higher coatability. An example of the method of depositing the coating materials by the metal hydroxide is disclosed in JP-A No. 9-265985, in which cobalt (Co) and manganese (Mn) are deposited on the surfaces of the lithium nickelate ($LiNiO_2$) particles using hydroxide deposition method thereof.

SUMMARY

However, in a wet deposition method having a higher coatability, during a process of diffusing the coating materials and the composite oxide particles to a solvent and depositing hydroxides of the coating materials on the surfaces of the composite oxide particles, elements of the composite oxide particles may be diffused out to the solvent and deteriorated.

Therefore, it is desirable to provide a method of manufacturing a cathode active material capable of increasing the secondary battery capacity and improving the charge/discharge efficiency by solving above-described problems.

According to an embodiment, there is provided a method of manufacturing a cathode active material, the method including the step of: precipitating step for providing a solution of a deposition component onto composite oxide particles including lithium Li and nickel Ni, removing a solvent from the solution on the composite oxide particles within a short time period, and precipitating the deposition component on surfaces of the composite oxide particles; and heating step for heating under an oxidation atmosphere the composite oxide particles with the deposition component precipitated on the surfaces.

The composite oxide particles may have an average composition represented by following Chemical Formula 1:

[Chemical Formula 1]

$$Li_aNi_xCo_yAl_zO_2$$

(where, nickel (Ni) may be substituted with one or more metal elements selected from a group including manganese (Mn), chrome (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce) within a range of 0.1 or less of nickel (Ni) assuming that a total amount of nickel (Ni) is set to 1. In addition, in the Chemical Formula 1, coefficients a, x, y, and z are set to 0.3≤a≤1.05, 0.60<x<0.90, 0.10<y<0.40, and 0.01<z<0.20, respectively, and a relationship between x, y and z is set to x+y+z=1.)

The solution may be provided on the heated composite oxide particles to remove the solvent to precipitate the deposition component on surfaces of the composite oxide particles.

The composite oxide particles may be heated to a temperature equal to or higher than a boiling point of the solution containing the deposition component.

The deposition component may be made of oxoacid salt, and the oxoacid salt may be ammonium salt.

An addition amount of the oxoacid salt may be ranged between 0.01 parts by weight and 20 parts by weight with respect to 100 parts by weight of the composite oxide particle.

The composite oxide particles with the deposition component may be heated within a temperate range between 500° C. and 1200° C. in the heating step.

An average particle diameter of the cathode active material is ranged between 2.0 μm and 50 μm.

According to the present application, it is possible to manufacture a cathode active material capable of increasing the secondary battery capacity and improving the charge/discharge efficiency.

Additional features and advantages are described herein, and will be apparent from the following Detailed Description and the figures.

DETAILED DESCRIPTION

Hereinafter, an exemplary embodiment will be described in detail with reference to the accompanying drawings.

[Cathode Active Material]

A cathode active material according to an embodiment is obtained by depositing an element such as oxoacid salt on at least a part of the surfaces of composite oxide particles. The element such as oxoacid salt may be chemically combined with or deposited in an ion state on a material formed on a surface of the composite oxide particle.

The composite oxide particle may include lithium (Li) and nickel (Ni). For example, preferably, its average composition is represented by the following Chemical Formula 1. It is possible to improve a discharge capacity by using this composite oxide particle.

[Chemical Formula 1]

$Li_aNi_xCo_yAl_zO_2$ (where, nickel (Ni) may be substituted with one or more metal elements selected from a group including manganese (Mn), chrome (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce) within a range of 0.1 or less of nickel (Ni) assuming that a total amount of nickel (Ni) is set to 1. In addition, in the Chemical Formula 1, coefficients a, x, y, and z are set to $0.3 \leq a \leq 1.05$, $0.60 < x < 0.90$, $0.10 < y < 0.40$, and $0.01 < z < 0.20$, respectively, and a relationship between x, y and z is set to $x+y+z=1$.)

As described in the Chemical Formula 1, for example, the coefficient a has a range of $0.3 \leq a \leq 1.05$. When the coefficient a is smaller than the above range, the bedded salt structure of the crystals of the cathode active material may be collapsed. This may make difficult to recharge a battery, and thus, a battery capacity may become significantly reduced. When the coefficient a is larger than the above range, lithium may be diffused to areas other than the composite oxide particle. This may make difficult to control basicity in the subsequent processes, and finally, make difficult to promote gelatification during a kneading process of a cathode paste.

For example, the coefficient x may have a range of $0.60 < x < 0.90$. The coefficient x may have a range of, preferably, $0.65 < x < 0.85$, or more preferably, $0.70 < x < 0.80$. When the coefficient x is smaller than the above range, the charge capacity of the cathode active material may be reduced. When the coefficient x is larger than the above range, safety of the crystal structure of the composite oxide particle may be degraded. This may decrease a charge/discharge repetition capacity and safety of the cathode active material.

For example, the coefficient y may have a range of $0.10 < y < 0.40$. The coefficient y may have a range of, preferably, $0.15 < y < 0.35$, or more preferably, $0.20 < y < 0.30$. When the coefficient y is smaller than the above range, safety of the crystal structure of the composite oxide particle may be degraded. This may decrease a charge/discharge repetition capacity and safety of the cathode active material. When the coefficient y is larger than the above range, the discharge capacity of the cathode active material may be reduced.

For example, the coefficient z may have a range of $0.01 < z < 0.20$. The coefficient z may have a range of, preferably, $0.02 < z < 0.15$, or more preferably, $0.03 < z < 0.10$. When the coefficient z is smaller than the above range, safety of the crystal structure of the composite oxide particle may be degraded. This may decrease a charge/discharge repetition capacity and safety of the cathode active material. When the coefficient z is larger than the above range, the discharge capacity of the cathode active material may be reduced.

An average particle diameter of the cathode active material is preferably ranged between 2.0 μm and 50 μm. When the average particle diameter is smaller than 2.0 μm, the cathode active material layer may be exfoliated when the cathode active material layer is pressed in a process of manufacturing the cathode. In addition, since the surface area of the cathode active material increases, an additive amount of the conductor or binder should increase, and the energy density per unit weight tends to be reduced. On the other hand, if the average particle diameter is larger than 50 μm, the particle may pass through the separator and generate a short circuit.

[Method of Manufacturing Cathode Active Material]

Subsequently, a method of manufacturing a cathode active material according to an embodiment will be described. A cathode active material that can be typically obtained may be used as a start material of the composite oxide particle. In some cases, secondary particles may be grinded using a ball mill or a grinder.

The lithium nickelate having the chemical composition represented by the Chemical Formula 1 may be formed using a well-known technique. Specifically, for example, a nickel compound, a cobalt compound, an aluminum compound, a lithium compound, and the like are solved in water, and sufficiently agitated while a sodium hydroxide solution is added so as to obtain a nickel-cobalt-aluminum composite coprecipitated hydroxide. Then, a precursor obtained by washing with water and drying the nickel-cobalt-aluminum composite coprecipitated hydroxide is baked, so that lithium nickelate can be obtained. As necessary, the lithium nickelate may be crushed after the baking.

A source material of the nickel compound may include, for example, an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogen sulfate, nickel nitride, nickel nitrite, nickel phosphate, and nickel thiocyanate, or an organic compound such as nickel oxalate, and nickel acetate. In addition, a single compound or a combination of two or more compounds of them may be selectively used.

A source material of the cobalt compound may include, for example, an inorganic compound such as cobalt hydroxide, cobalt carbonate, cobalt nitrate, cobalt fluoride, cobalt chloride, cobalt bromide, cobalt iodide, cobalt chlorate, cobalt perchlorate, cobalt bromate, cobalt iodate, cobalt oxide, cobalt phosphinate, cobalt sulfide, cobalt hydrogen sulfide, cobalt sulfate, cobalt hydrogen sulfate, cobalt thiocyanate, cobalt nitrite, cobalt phosphate, cobalt dihydrogen phosphate, and cobalt hydrogen carbonate, or an organic compound such as cobalt oxalate, and cobalt acetate. In addition, a single compound or a combination of two or more compounds of them may be selectively used.

A source material of the aluminum compound may include, for example, an inorganic compound such as aluminum hydroxide, aluminum nitrate, aluminum fluoride, aluminum chloride, aluminum bromide, aluminum iodide, aluminum perchlorate, aluminum oxide, aluminum sulfide, aluminum sulfate, and aluminum phosphate, or an organic compound such as aluminum acetate. In addition, a single compound or a combination of two or more compounds of them may be selectively used.

A source material of the lithium compound may include, for example, an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogen sulfate, lithium sulfate, lithium hydrogen sulfate, lithium nitride, lithium azide, lithium nitrite, lithium phosphate, lithium dihydrogen phosphate, and lithium hydrogen carbonate, or an organic compound such as methyl lithium, vinyl lithium, isopropyl lithium, butyl lithium, phenyl lithium, lithium oxalate, and lithium acetate. In addition, a single compound or a combination of two or more compounds of them may be selectively used.

The lithium nickelate formed as described above is a lithium composite oxide used in a lithium-ion secondary battery capable of implementing a high voltage and a high energy density nearly equal to those of the lithium cobaltate. Since this composite oxide contains a small amount of cobalt which is unstable from the viewpoint of a source material and is expensive, it is advantageously economic.

Also, this composite oxide advantageously has a larger current capacity in comparison with lithium cobaltate, and it is preferable to improve this advantage. In addition, this composite oxide has a charge current capacity smaller than a discharge current capacity, and a large irreversible capacity in comparison with the lithium cobaltate. As a result, this composite oxide has low charge/discharge efficiency and it is demanded to improve.

In this regard, according to an embodiment, the composite oxide particle obtained by using the lithium nickelate manufactured by well-known techniques as a source material is further processed to reform its surface, in order to improve charge/discharge efficiency as well as a discharge current capacity when this composite oxide particle is used as a cathode material. Specifically, the cathode active material may include, for example, lithium, nickel, cobalt, or aluminum. The cathode active material may selectively include secondary particles (i.e., composite oxide particles) obtained by aggregating primary particles having a layered crystal structured by substituting a part of nickel with a small amount of one of more material selected from a group including manganese, chrome, iron, vanadium, magnesium, titanium, zirconium, niobium, molybdenum, tungsten, copper, zinc, gallium, indium, tin, lanthanum, and cerium. For the composite oxide particle, a solution obtained by solving a deposition component into a solvent is deposited, and the solvent is removed within a short time period to precipitate the deposition component. Then, the composite oxide particle is further heated under an oxidation atmosphere. As a result, it is possible to obtain a cathode active material used in a nonaqueous electrolyte secondary battery capable of improving battery properties.

In addition, it is preferable to use oxoacid or oxoacid salt as the deposition component. Since the nickel-based composite oxide particles have a large carbonic acid composition, and the discharge capacity increases, and it becomes easy to generate gases from the composite oxide particle. Since the oxoacid and the carbonic acid of the composite oxide particle are substituted with each other by depositing the oxoacid or oxoacid salt, it is difficult to generate gases. In addition, it may make difficult to generate gases from electrolyte solution decomposition by degrading oxidation nature of the surface of the cathode material.

Preferably, the oxoacid salt is ammonium salt. Since the ammonium salt can be decomposed in a relatively lower temperature during a process of depositing a solution obtained by solving ammonium salt on the composite oxide particle and then heating it, anionic residues can be effectively remained on the surface.

For example, the oxoacid or oxoacid salt may include hydrosulfate, nitrate, borate, phosphate, silicate, tungstic acid, molybdic acid, vanadic acid, titanic acid, chromic acid, stannic acid, germinate, those having different oxidation numbers from these acidic materials, those (including orthoacid and meta-acid) having the same oxidation number as these acidic materials but having a different element ratio between bound oxygen and a main element depending on their condensation states, isopoly-acid having the same main element for these kinds of condensed acid, and heteropolyacid having a different main element from these acidic materials.

Hereinafter, a process applied to the composite oxide particles will be described.

First, a solution obtained by solving a deposition component such as ammonium salt into a solvent using ammonium sulfate or ammonium nitrate as a start material is deposited on the heated composite oxide particle. The deposition may be performed by spraying the solution onto the scattered composite oxide particles or dropping the solution onto the composite oxide particles and mixing them. In this case, the composite oxide particles are preheated, so that the solvent for solving the deposition component is removed within, for example, 10 seconds, and the deposition component can be precipitated on the surface of the composite oxide particle. The heating temperature is preferably controlled to be equal to or larger than a boiling point of the solution having the deposition component.

A solvent for solving the deposition component may include an inorganic solvent such as water.

In this manner, the solvent for solving the deposition component can be removed within a short time period, and a time required to mix the composite oxide particle with the solvent contained in the solution can be shortened. Typically, when the solvent is mixed with the composite oxide particles, lithium ions in the composite oxide particles are solved out to the solvent. However, according to the above method, since elution of the lithium ions is avoid, it is possible to prevent deformation of the surface of the composite oxide particle, or reduction of the capacity of the cathode active material.

In addition, since a liquid phase obtained by solving the deposition component into the solvent is deposited on the composite oxide particle according to an embodiment, it is possible to regularize precipitation of the deposition component.

In addition, the regularization of the precipitation of the deposition component may be particularly effective when an additive amount of the deposition component added to the composite oxide particle is small. If oxoacid salt is used as the deposition component, the additive amount of the oxoacid salt is preferably ranged between 0.01 and 20 parts by weight of 100 parts by weight of the composite oxide particle. When the additive amount is smaller than the above range, a surface reformation effect of the composite oxide particle is reduced. This may decrease a charge/discharge repetition capacity and safety of the cathode active material. When the additive amount is larger than the above range, the precipitation of the deposition component becomes irregular. Similarly, this may decrease a charge/discharge repetition capacity and safety of the cathode active material.

Furthermore, preferably, the solvent can be easily removed as a concentration of the deposition component in the solution increases under a saturation concentration.

When oxoacid salt is used as the deposition component, the additive amount of the oxoacid salt is ranged between 0.01 and 20 wt %, preferably between 0.02 and 15 wt %, or more preferably between 0.05 and 10 wt % with respect to the weight of the composite oxide particle. If the additive amount is smaller than the above range, it becomes difficult to improve a discharge capacity and charge/discharge efficiency of the cathode active material containing lithium (Li) and nickel (Ni) as a main component. On the other hand, when the additive amount is larger than the above range, the discharge capacity of the cathode active material is reduced, and it becomes difficult to achieve the present application.

[Heating Process]

Subsequently, the composite oxide particles obtained by precipitating the deposition component are baked through a heating process. The deposition component deposited on the composite oxide particle is decomposed through this heating process. When ammonium salt is used as the deposition component, the ammonium salt is decomposed and removed to generate ammonia gases, and finally, ions remain.

In the aforementioned heating process, the deposition component is preferably decomposed. Since the deposition component is decomposed, a material generated from the deposition component is more effectively scattered on the surface of the composite oxide particle. Therefore, it is possible to more regularly precipitate the deposition component in comparison with a conventional method of depositing a mixture of the composite oxide particles and solid particles. For this reason, in the heating process, it would be preferable to heat the composite oxide particles over the decomposition temperature of the deposition component.

As described above, it is possible to more regularly precipitate the deposition component by heating the composite oxide particles over the decomposition temperature of the deposition component. Furthermore, it is possible to still more regularly precipitate the deposition component by using a method of depositing the liquid phase on the composite oxide particle and removing the solvent within a short time period in combination with the above method.

For example, when the ammonium sulfate is used as the deposition component, the heating temperature for the composite oxide particles is set to 280° C. or higher, which is a decomposition temperature of ammonium sulfate.

In addition, if the heating process is performed in a low temperature under 500° C., a portion of the surface layer of the composite oxide particle is chemically reacted and eroded due to a decomposed material of oxoacid salt such as hydrosulfate and nitrate, and it was found that a specific surface area increases, a discharge capacity of a secondary battery adopting this composite oxide particle decrease, and charge/discharge efficiency decreases. However, if the heating process is performed in a high temperature, it was found that a specific surface area decreases, a discharge capacity of a secondary battery is recovered, and the charge/discharge efficiency is recovered even when such a condition occurs.

The inventors reviewed in detail effects of recovering the discharge capacity and the charge/discharge efficiency, and as a result, found that it is possible to achieve more than the recovery effects by selecting conditions in comparison with the discharge capacity and the charge/discharge efficiency before the process. Specifically, a heating temperature for the composite oxide particles according to an embodiment is preferably ranged between 500 and 1200° C., more preferably between 550 and 1100° C., or still more preferably between 600 and 1000° C. If the heating temperature is lower than this range, it would be difficult to achieve the effects of improving the discharge capacity and efficiency of the cathode active material containing lithium (Li) and nickel (Ni) as a main component as described above. On the other hand, if the heating temperature is higher than this range, a crystal structure of the cathode active material containing lithium (Li) and nickel (Ni) as a main component becomes unstable, and accordingly, the discharge capacity may be significantly reduced. In addition, an atmospheric condition of the heating process according to an embodiment is preferably set to an acidic atmosphere typically used to produce lithium nickelate or the like, or more preferably an oxygen atmosphere.

The heating of the composite oxide particles is executed preferably for 0.5 to 80 hours, more preferably for 1.0 to 40 hours, further more preferably for 1.5 to 20 hours.

According to an embodiment, a particle size of the composite oxide may be controlled as necessary by a crushing or sorting operation after the heating process. Through the aforementioned processes, the cathode active material according to an embodiment is obtained. The cathode active material according to an embodiment may be preferably used as an electrode active material, and more preferably as an electrode of a nonaqueous electrolyte secondary battery.

Hereinafter, a nonaqueous electrolyte secondary battery using the aforementioned cathode active material according to an embodiment will be described.

(1-1) First Embodiment of Nonaqueous Electrolyte Secondary Battery

[Structure of Nonaqueous Electrolyte Secondary Battery]

Figure 1:
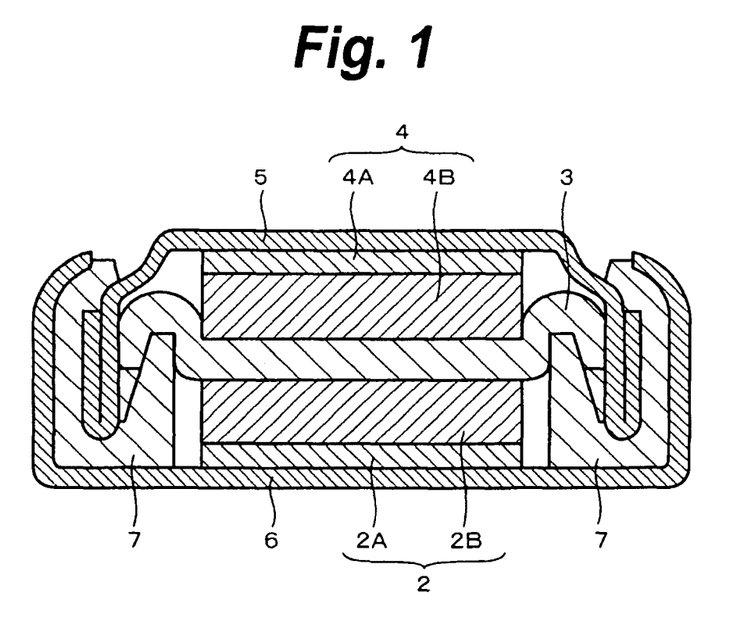
FIG. 1 is a schematic cross-sectional view illustrating a nonaqueous electrolyte secondary battery using a cathode active material according to an embodiment.

FIG. 1 is a cross-sectional view illustrating a nonaqueous electrolyte secondary battery using the cathode active material manufactured by the method according to an embodiment.

This nonaqueous electrolyte secondary battery is called a coin type because it is formed by stacking a disk-shaped cathode 2 stored in an outer can 6 and a disk-shaped anode 4 stored in an outer cup 5 with a separator 3 interposed therebetween. The separator 3 is impregnated with an electrolyte solution which is a liquid electrolyte, and circumferential portions of the outer can 6 and the outer cup 5 are sealed with a gasket 7. The outer can 6 and the outer cup 5 are made of metal such as stainless steel or aluminum.

For example, the cathode 2 has a cathode charge collector 2A and a cathode mixture layer 2B formed on the charge collector 2A. The cathode charge collector 2A is made of a metallic foil such as a copper foil, a nickel foil, or a stainless steel foil. The cathode mixture layer 2B contains, for example, a cathode active material, and may additionally contain a conductant agent such as carbon black or graphite and a binder such as polyvinylidene fluoride as necessary. The cathode active material according to the first embodiment may be used as a cathode active material. The cathode may additionally contain another cathode active material.

For example, the anode 4 includes an anode charge collector 4A and an anode mixture layer 4B formed on the charge collector 4A. The anode charge collector 4A may be made of a metallic foil such as a copper foil, a nickel foil, or a stainless steel foil.

For example, the anode mixture layer 4B includes, as an anode active material, a single material or a combination of two or more materials of lithium metal, lithium alloy, or anode materials capable of occluding and disengaging lithium. A binder such as polyvinylidene fluoride may be added as necessary.

The anode material capable of occluding and disengaging lithium may include a single material or a combination of two or more materials selected from a group including a carbonic material, a metallic compound, tin, tin alloy, silicon, silicon alloy, and conductive polymer. When a cathode active material according to an embodiment is used, a carbonic material is preferably used as an anode material. The carbonic material is not particularly limited, but may be typically obtained by baking an organic material. In addition, natural or artificial graphite may be used. If an electron conductivity of the carbonic material is not sufficient to collect charges, a conductant agent may be preferably added.

The metallic compound may include a tungsten oxide ($WO_2$), a niobium oxide ($Nb_2O_5$), a tin oxide (SnO), or a lithium-titanium composite oxide ($Li_4Ti_5O_{12}$) having a spinel structure. The conductive polymer may include polyacetylene, polypyrrole, or the like.

The separator 3 is used to separate the positive and anodes 2 and 4 from each other and transmit lithium ions while preventing a short circuit of the current generated by contact of the electrodes. The separator 3 may be made of the same materials as those of a conventional battery. The separator 3 is preferably made of a polyolefin-based microporous film capable of exhibiting a short-circuit prevention effect as well as improving safety of the battery due to a shutdown effect. For example, the separator 3 may be a microporous membrane formed of polyethylene or polypropylene resin.

More preferably, the separator 3 may be made by stacking or mixing polyethylene having a lower shutdown temperature and polypropylene having a superior anti-acid property because it can provide both a shutdown property and a float property.

The electrolyte solution is obtained by solving electrolyte salt into a nonaqueous solvent. Ion conductivity can be achieved by ionizing the electrolyte salt. The electrolyte solution may include, but not limited to, a conventional nonaqueous solvent-based electrolyte solution or the like. The electrolyte salt may preferably include alkali metal such as calcium halide, perchlorate, thiocyanate, fluoroborate, phosphorous fluorate, arsenic fluorate, aluminum fluorate, or trifluoromethyl hydrosulfate. Specifically, the electrolyte salt may include lithium salt such as lithium hexafluorophosphate ($LiPF_6$), lithium perchlorate ($LiClO_4$), lithium hexafluoroarsenate ($LiAsF_6$), lithium tetrafluoroborate ($LiBF_4$), lithium trifluoromethanesulfate ($LiCF_3SO_3$), or Lithium trifluoromethane sulfonamide ($LiN(CF_3SO_2)_2$). The electrolyte salt may be a single material or a combination of two or more materials selected from a group including these materials.

The solvent for solving the electrolyte salt may preferably include propylene carbonate (PC), ethylene carbonate (EC), γ-butyrolactone, N-methylpyrrolidone, acetonitrile, N,N-dimethylformamide, dimethyl sulfoxide, tetrahydrofuran, 1,3-dioxolan, methyl formate, sulfolane, oxazolidinone, thionyl chloride, 1,2-dimethoxyethane, diethylene carbonate, or derivatives or mixtures of them. The solvent may be a single material or a combination of two or more materials selected from a group including these materials.

When this nonaqueous electrolyte secondary battery is discharged, for example, lithium ions are disengaged from the anode 4, or lithium metal is converted into lithium ions, so that lithium ions are solved out and reacted with the cathode mixture layer 2B by way of the electrolyte solution. When the nonaqueous electrolyte secondary battery is charged, for example, lithium ions are disengaged from the cathode mixture layer 2B, and then occluded to the anode 4 by way of the electrolyte solution or precipitated as lithium metal.

The nonaqueous electrolyte secondary battery may be used in a 4.20 V specification, in which an open-circuit voltage is ranged between 2.50 and 4.20 V when every pair of positive and anodes is fully charged, as well as a high voltage specification, in which the open-circuit voltage is ranged between 4.25 and 4.55 V, or preferably between 4.25 and 4.50 V. In the high voltage specification battery, the capacity of the cathode active material that has been unused can be used. Therefore, since the discharged amount of lithium increases near a unit weight of the cathode active material, it is possible to provide a nonaqueous electrolyte secondary battery having a high capacity and a high energy density.

[Method of Manufacturing Nonaqueous Electrolyte Secondary Battery]

Hereinafter, a method of manufacturing a nonaqueous electrolyte secondary battery according to the first embodiment will be described.

The cathode 2 is fabricated as described below. First, for example, a cathode active material, a conductant agent, and a binder are mixed to provide a cathode mixture. The cathode mixture is diffused to a solvent such as N-methyl-2-pyrrolidone (NMP) to obtain a cathode mixture slurry.

Subsequently, the cathode mixture slurry is coated on the cathode charge collector 2A to remove the solvent, and then, press-molded using a roll-press machine or the like to provide a cathode mixture layer 2B, so that the cathode 2 is manufactured.

The anode 4 is manufactured as follows. First, for example, an anode active material and a binder are mixed to provide an anode mixture, and the anode mixture is diffused to a solvent such as N-methyl-2-pyrolidone to obtain an anode mixture slurry.

Subsequently, the anode mixture slurry is coated on the anode charge collector 4A to remove the solvent, and then, press-molded using a roll-press machine or the like to provide an anode mixture layer 4B, so that the anode 4 can be manufactured.

The anode mixture layer 4B may be formed, for example, by a vapor phase method, a liquid phase method, a baking method, or a combination of two or more of them. In addition, the vapor phase method may include, for example, a physical deposition method or a chemical deposition method. Specifically, the vapor phase method may include a vacuum deposition method, a sputtering method, an ion plating method, a laser ablation method, a thermal CVD method, or a plasma CVD (Chemical Vapor Deposition) method. The liquid phase method may include an electrolyte or electroless plating well known in the art. The baking method may include methods well known in the art, such as an atmospheric baking method, a reaction baking method, or a hot press baking method.

Subsequently, the anode 4 and the separator 3 are placed in this order in the center of the outer cup 5, and the electrolyte solution is injected over the separator 3. Then, the outer can 6 for storing the cathode 2 is assembled with the outer cup 5 and sealed with a gasket 7. Through this process, a nonaqueous electrolyte secondary battery as shown in FIG. 1 can be manufactured.

(1-2) Second Embodiment of Nonaqueous Electrolyte Secondary Battery

[Structure of Nonaqueous Electrolyte Secondary Battery]

Figure 2:
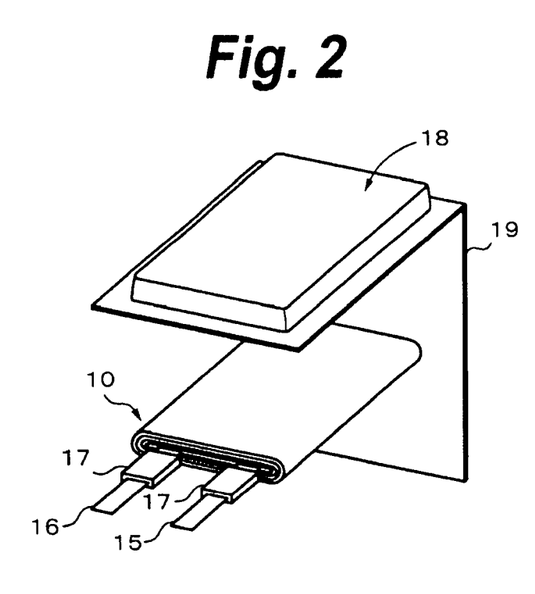
FIG. 2 is a schematic view illustrating a nonaqueous electrolyte secondary battery using a cathode active material according to an embodiment.

FIG. 2 illustrates a structure of a nonaqueous electrolyte secondary battery using a cathode active material according to an embodiment. As shown in FIG. 2, the nonaqueous electrolyte secondary battery is sealed by storing the battery element 10 in an outer material 19 made of moisture-proof laminate film and welding the circumference of the battery element 10. The battery element 10 may have positive and anode terminals 15 and 16, and their lead wires are extracted through the outer material 19. Both surfaces of the positive and negative terminals 15 and 16 are covered with a bonding film 17 in order to improve adhesion with the outer material 19.

For example, the outer material 19 has a stack structure including an adhesive layer, a metallic layer, and a surface protection layer in sequence. The adhesive layer may be a polymer film formed of, for example, polypropylene (PP), polyethylene (PE), cast polypropylene (CPP), linear low density polyethylene (LLDPE), or low density polyethylene (LDPE). The metallic layer may be a metallic foil formed of, for example, aluminum (Al). The metallic foil may be formed of metals other than aluminum (Al). The surface protection layer may be formed of, for example, nylon (Ny) or polyethylene terephthalate (PET). In addition, the surface facing the adhesive layer becomes a surface for storing the battery element 10.

Figure 3:
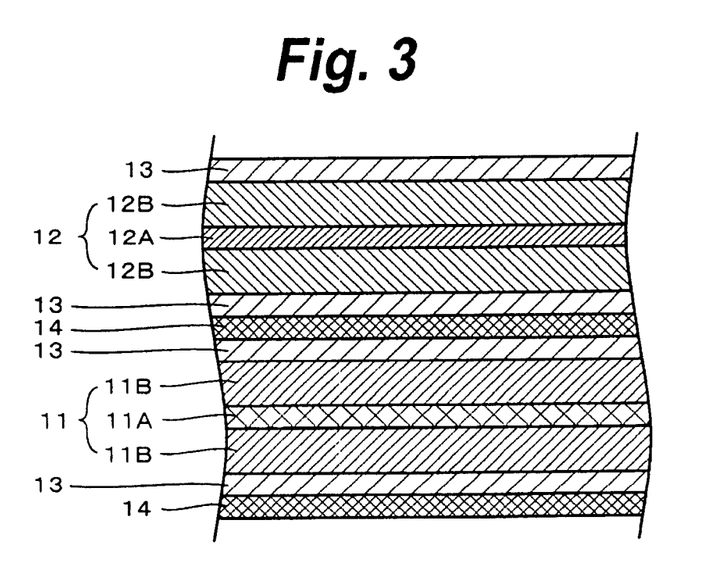
FIG. 3 is an enlarged view illustrating a part of the battery element of FIG. 2.

As shown in FIG. 3, the battery element 10 is a winding-type battery element 10 obtained by staking a zonal anode 12 having gel electrolyte layers 13 on both surfaces, a zonal cathode 11 having-gel electrolyte layers 13 on both surfaces, and a separator 14 and winding them in a longitudinal direction.

The cathode 11 includes a zonal cathode charge collector 11A and cathode mixture layers 11B formed on both surfaces of the cathode charge collector 11A.

A cathode terminal 15 is connected to one end of the cathode 11 in a longitudinal direction by, for example, a spot welding or an ultrasonic welding. The cathode terminal 15 may be made of, for example, metal such as aluminum (Al).

Similarly, the anode 12 includes a zonal anode charge collector 12A and anode mixture layers 12B formed on both surfaces of the anode charge collector 12A.

Similarly, the anode terminal 16 is connected to one end of the anode 12 in a longitudinal direction by, for example, a spot welding or an ultrasonic welding. The anode terminal 16 may be made of, for example, copper (Cu) or nickel (Ni).

The cathode charge collector 11A, the cathode mixture layer 11B, the anode charge collector 12A, and the anode mixture layer 12B may be manufactured as described in connection with the first embodiment.

The gel electrolyte layer 13 has, so called, a gel phase including an electrolyte solution and a polymer compound serving as a retaining material retaining the electrolyte solution. The gel electrolyte layer 13 is preferably used to provide high ion conductivity as well as to prevent battery leakage. The composition of electrolyte solution (i.e., a type of the solvent or the electrolyte salt) is similar to that described in connection with the first embodiment.

For example, the polymer compound may include polyacrylonitrile, polyvinylidene fluoride, copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylate, styrene-butadiene rubber, nitrile-butadiene rubber, polysteren, or polycarbonate. Particularly, from the viewpoint of electro-chemical safety, polyacrylontrile, polyvinylidene fluoride, polyhexafluoropropylene, or polyethylene oxide may be preferably.

[Method of Manufacturing Nonaqueous Electrolyte Secondary Battery]

Hereinafter, a method of manufacturing a nonaqueous electrolyte secondary battery according to the second embodiment will be described. First, a gel electrolyte layer 13 is formed by coating a precursor solution containing a solvent, electrolyte salt, a polymer compound, and a combined solvent on each of the positive and anodes 11 and 12, and volatilizing the combined solvent. In addition, the cathode terminal 15 is previously attached on an end of the cathode charge collector 11A, and the anode terminal 16 is also previously attached on an end of the anode charge collector 12A.

Then, a stack structure is obtained by stacking the anode 12 and the cathode 11 having the gel electrolyte layer 13 with a separator 14 interposed therebetween. The stack structure is winded in a longitudinal direction to form a winding-type battery element 10.

Subsequently, a concave portion 18 is formed by deeply drawing the outer material 19 made of a laminate film, and the battery element 10 is inserted into the concave portion 18. An unprocessed portion of the outer material 19 is folded back at an upper side of the concave portion 18, and an outer circumference of the concave portion 18 is thermally adhered and sealed. Through this procedure, a nonaqueous electrolyte secondary battery according to the second embodiment can be manufactured.

According to an embodiment, a solution containing a deposition component such as oxoacid is deposited on the surface of the composite oxide particle, and the solvent is removed to precipitate the deposition component. Then, the composite oxide particles having the precipitated deposition component are heated. As a result, it is possible to obtain a nonaqueous electrolyte secondary battery having a high capacity and improved charge/discharge efficiency. Accordingly, the secondary battery according an embodiment can be widely used in small portable electronic devices such as a video camera, a laptop computer, a word processor, a radio cassette recorder, or a mobile phone based on the improved properties such as a light weight, a high capacity, and a high energy density.

EXAMPLES

Hereinafter, the present application will be explained in more detail by examples, but not limited thereto.

Example 1

First, nickel sulfate, cobalt sulfate, and sodium aluminate are solved in water and sufficiently agitated while a sodium hydroxide solution is added so as to obtain a nickel-cobalt-aluminum composite coprecipitated hydroxide having a molecular ratio Ni:Co:Al=77:20:3. Then, a precursor having a molecular ratio Li:(Ni+Co+Al)=105:100 is obtained by washing with water and drying the coprecipitated hydroxide, and adding lithium hydroxide hydrate. The precursor is baked under an oxygen atmosphere at a temperature of 700° C. for 10 hours, cooled to a room temperature, and then crushed so that the composite oxide particle containing as a main component lithium nickelate having a composition of $Li_{11.03}Ni_{0.77}Co_{0.20}Al_{0.03}O_2$ can be obtained. In addition, an average particle diameter of the composite oxide particles that can be obtained has been measured by a laser scattering method, and the resulting diameter value was 13 μm.

The composite oxide particles of 100 parts by weight were heated and agitated in a planetary mixer at a temperature of 120° C. Then, a water solution obtained by solving ammonium sulfate $((NH_4)_2SO_4)$ of 0.83 parts by weight which is a commercially available reagent into pure water of 10 parts by weight was uniformly sprayed to the heated composite oxide particles while agitating and mixing the composite oxide particles, so that the ammonium sulfate was deposited on the surfaces of the composite oxide particles. Subsequently, the composite oxide particles having the deposited ammonium sulfate were baked under an oxygen stream at a temperature of 700° C. for 4 hours, and then cooled to a room temperature, so that a cathode active material can be obtained.

Example 2

Unlike the Example 1, the cathode active material was obtained by substituting ammonium sulfate $((NH_4)_2SO_4)$ of 0.83 parts by weight with ammonium pentaborate $((NH_4)_2 \cdot 5B_2O_3 \cdot 8H_2O)$ of 0.34 parts by weight. Other conditions were similarly set to those of the Example 1.

Example 3

Unlike the Example 1, the cathode active material was obtained by substituting ammonium sulfate $((NH_4)_2SO_4)$ of 0.83 parts by weight with a mixture of ammonium sulfate $((NH_4)_2SO_4)$ of 0.83 parts by weight and ammonium pentaborate $((NH_4)_2 \cdot 5B_2O_3 \cdot 8H_2O)$ of 0.17 parts by weight. Other conditions were similarly set to those of the Example 1.

Example 4

The composite oxide particles having the deposited ammonium sulfate were baked under an oxygen stream at a temperature of 700° C. for 0.1 hours. Other processes and conditions were similar to those of the Example 1.

Example 5

The composite oxide particles having the deposited ammonium sulfate were baked under an oxygen stream at a temperature of 700° C. for 0.5 hours. Other processes and conditions were similar to those of the Example 1.

Example 6

The composite oxide particles having the deposited ammonium sulfate were baked under an oxygen stream at a temperature of 700° C. for 80 hours. Other processes and conditions were similar to those of the Example 1.

Example 7

The composite oxide particles having the deposited ammonium sulfate were baked under an oxygen stream at a temperature of 700° C. for 100 hours. Other processes and conditions were similar to those of the Example 1.

Example 8

The composite oxide particles are not heated at a temperature of 120° C. and the water solution of ammonium sulfate is sprayed to the unheated composite oxide particles. Other processes and conditions were similar to those of the Example 1.

Comparative Example 1

The composite oxide particles are not deposited with ammonium sulfate but employed as the cathode active material by themselves. Other processes and conditions were similar to those of the Example 1.

Comparative Example 2

The composite oxide particles were formed as in the Example 1, and then, the composite oxide particles of 100 parts by weight and ammonium sulfate $((NH_4)_2SO_4)$ of 0.83 parts by weight were sufficiently crushed and mixed in a mortar. Subsequently, this mixture was baked under an oxygen stream at a temperature of 700° C. for 4 hours, and then, cooled to a room temperature, so that a cathode active material was obtained.

Comparative Example 3

Unlike the Comparative Example 2, the cathode active material was obtained by substituting ammonium sulfate $((NH_4)_2SO_4)$ of 0.83 parts by weight with ammonium pentaborate $((NH_4)_2 \cdot 5B_2O_3 \cdot 8H_2O)$ of 0.34 parts by weight. Other conditions were similarly set to those of the Comparative Example 2.

Comparative Example 4

Unlike the first embodiment, the cathode active material was obtained by substituting ammonium sulfate $((NH_4)_2SO_4)$ of 0.83 parts by weight with a mixture of ammonium sulfate $((NH_4)_2SO_4)$ of 0.83 parts by weight and ammonium pentaborate $((NH_4)_2 \cdot 5B_2O_3 \cdot 8H_2O)$ of 0.17 parts by weight. Other conditions were similarly set to those of the Example 1.

Evaluation

Using the cathode active materials of the Examples 1 to 3 and the Comparative Examples 1 to 8, a coin-type nonaqueous electrolyte secondary battery shown in FIG. 1 has been manufactured. First, a mixture of the manufactured cathode active material powder of 86 wt %, graphite as a conductant agent of 10 wt %, and polyvinylidene fluoride as a binder of 4 wt % was diffused to a solvent N-methyl-2-pyrrolidone (NMP), and then coated on both surfaces of the cathode charge collector made of a zonal aluminum foil having a thickness of 20 μm. Then, the solution on the surfaces of the cathode charge collector was dried, pressed in a roll-press machine, and punched on a disk plate having a predetermined size to obtain a pellet.

A lithium film punched on a disk plate having a predetermined size was used in the anode. A nonaqueous electrolyte solution obtained by solving as electrolyte salt $LiPF_6$ up to a concentration of 1 mol/dm$^3$ in a solvent obtained by mixing ethylene carbonate (EC) and methyl-ethyl carbonate (EMC) at a volume ratio of 1:1 was used as an electrolyte solution.

Subsequently, the positive and anodes formed on the pellet were stacked with a porous polyolefin film interposed therebetween, stored in the outer can and the outer cup, and sealed with a gasket, so that a coin-type nonaqueous electrolyte secondary battery having a diameter of 20 mm and a height of 1.6 mm was manufactured.

For the secondary battery manufactured as described above, a discharge capacity per one cycle was computed as an initial capacity, and charge/discharge efficiency (a discharge capacity divided by a charge capacity) was computed.

The charge operation of the battery was performed under a constant current and voltage with a charging current of 1.0 mA and a charging voltage of 4.25 V for a total charging time of 15 hours. The discharge operation of the battery was performed under a constant current with a discharging current of 1.0 mA up to a final voltage of 2.5 V. The measurement results are shown in Table 1.

charge/discharge efficiency can be improved in comparison with the Comparative Example 2 in which ammonium sulfate is deposited under a dry atmosphere. Similarly, in the Examples 2 and 3, it was recognized that the initial capacity and the charge/discharge efficiency can be improved in comparison with the Comparative Examples 3 and 4 in which ammonium pentaborate or a mixture of ammonium sulfate and ammonium pentaborate was deposited under a dry atmosphere.

It should be understood by those skilled in the art that various modifications, combinations, sub-combinations and alterations may occur depending on design requirements and other factors insofar as they are within the scope of the appended claims or the equivalents thereof. For example, the shape of the secondary battery may include, but not limited to, a cylindrical shape or a rectangular shape.

TABLE 1

| | COMPOSITE OXIDE PARTICLE | DEPOSITION COMPONENT | MIXING AMOUNT [parts by weight] | DEPOSITION METHOD |
|---|---|---|---|---|
| EXAMPLE 1 | $Li_{1.03}Ni_{0.77}Co_{0.20}Al_{0.03}O_2$ | AMMONIUM SULFATE | 0.83 | SPRAY AND HEATING |
| EXAMPLE 2 | $Li_{1.03}Ni_{0.77}Co_{0.20}Al_{0.03}O_2$ | AMMONIUM PENTABORATE | 0.34 | SPRAY AND HEATING |
| EXAMPLE 3 | $Li_{1.03}Ni_{0.77}Co_{0.20}Al_{0.03}O_2$ | AMMONIUM SULFATE AMMONIUM PENTABORATE | 0.83 0.17 | SPRAY AND HEATING |
| EXAMPLE 4 | $Li_{1.03}Ni_{0.77}Co_{0.20}Al_{0.03}O_2$ | AMMONIUM SULFATE | 0.83 | SPRAY AND HEATING |
| EXAMPLE 5 | $Li_{1.03}Ni_{0.77}Co_{0.20}Al_{0.03}O_2$ | AMMONIUM SULFATE | 0.83 | SPRAY AND HEATING |
| EXAMPLE 6 | $Li_{1.03}Ni_{0.77}Co_{0.20}Al_{0.03}O_2$ | AMMONIUM SULFATE | 0.83 | SPRAY AND HEATING |
| EXAMPLE 7 | $Li_{1.03}Ni_{0.77}Co_{0.20}Al_{0.03}O_2$ | AMMONIUM SULFATE | 0.83 | SPRAY AND HEATING |
| EXAMPLE 8 | $Li_{1.03}Ni_{0.77}Co_{0.20}Al_{0.03}O_2$ | AMMONIUM SULFATE | 0.83 | SPRAY AND HEATING |
| COMPARATIVE EXAMPLE 1 | $Li_{1.03}Ni_{0.77}Co_{0.20}Al_{0.03}O_2$ | — | — | — |
| COMPARATIVE EXAMPLE 2 | $Li_{1.03}Ni_{0.77}Co_{0.20}Al_{0.03}O_2$ | AMMONIUM SULFATE | 0.83 | MIX AND HEATING |
| COMPARATIVE EXAMPLE 3 | $Li_{1.03}Ni_{0.77}Co_{0.20}Al_{0.03}O_2$ | AMMONIUM PENTABORATE | 0.34 | MIX AND HEATING |
| COMPARATIVE EXAMPLE 4 | $Li_{1.03}Ni_{0.77}Co_{0.20}Al_{0.03}O_2$ | AMMONIUM SULFATE AMMONIUM PENTABORATE | 0.83 0.17 | MIX AND HEATING |

| | HEATING TEMPERATURE FOR COMPOSITE OXIDE [° C.] | HEATING TIME [hr] | INITIAL CAPACITY [mAh/g] | CHARGE/DISCHARGE EFFICIENCY [%] |
|---|---|---|---|---|
| EXAMPLE 1 | 120 | 4.0 | 191.2 | 93.6 |
| EXAMPLE 2 | 120 | 4.0 | 190.5 | 93.0 |
| EXAMPLE 3 | 120 | 4.0 | 191.0 | 93.1 |
| EXAMPLE 4 | 120 | 0.1 | 185.0 | 89.0 |
| EXAMPLE 5 | 120 | 0.5 | 189.2 | 92.0 |
| EXAMPLE 6 | 120 | 80.0 | 188.5 | 91.5 |
| EXAMPLE 7 | 120 | 100.0 | 185.1 | 88.3 |
| EXAMPLE 8 | — | 4.0 | 180.0 | 87.0 |
| COMPARATIVE EXAMPLE 1 | — | — | 184.9 | 89.2 |
| COMPARATIVE EXAMPLE 2 | — | 4.0 | 190.3 | 93.1 |
| COMPARATIVE EXAMPLE 3 | — | 4.0 | 189.3 | 92.1 |
| COMPARATIVE EXAMPLE 4 | — | 4.0 | 190.1 | 93.0 |

As shown in Table 1, in the Example 1 in which ammonium sulfate corresponding to oxoacid is deposited on the composite oxide particles with a heating, it was recognized that the initial capacity and the charge/discharge efficiency can be improved in comparison with the Comparative Example 1 in which ammonium sulfate was not deposited. In the Example 1 using the deposition method according to the present application, it was recognized that the initial capacity and the While, in the aforementioned descriptions, the composite oxide particles are preheated in order to remove the solvent from the solution deposited on the surfaces of the composite oxide particles, other methods may be used if the solvent can be removed within a short time. For example, a chamber for storing the composite oxide particles having the deposited solution may be adiabatically compressed or dried using a hot air blast.

Although a nonaqueous electrolyte secondary battery using an electrolyte solution has been described in the first embodiment and a nonaqueous electrolyte secondary battery using an electrolyte gel has been described in the second embodiment as an electrolyte, the present application is not limited thereto. It should be understood by those skilled in the art that various modifications, combinations, sub-combinations and alternations may occur depending on design requirements and other factors insofar as they are within the scope of the appended claims or the equivalents thereof.

For example, as described above, a polymer solid electrolyte using ion-conductive polymer or an inorganic solid electrolyte using an ion conductive inorganic material may be adopted as the electrolyte. They may be used in a singular form or in combination with other electrolytes. The polymer compounds that can be used in the polymer solid electrolyte may include polyether, polyester, polyphosphazene, or polysiloxane. The inorganic solid electrolyte may include an ion-conductive ceramic material, an ion-conductive crystal, ion-conductive glass, or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of manufacturing a cathode active material, the method comprising:
preheating composite oxide particles including lithium Li and nickel Ni;
providing a solution of a deposition component onto the preheated composite oxide particles;
precipitating the deposition component on surfaces of the composite oxide particles; and
heating under an oxidation atmosphere the composite oxide particles with the deposition component precipitated on the surfaces,
wherein the composite oxide particles are preheated to a temperature equal to or higher than a boiling point of the solution containing the deposition component, and
wherein a solvent in the solution is in contact with the composite oxide particles for 10 seconds or less.

2. The method according to claim 1, wherein the composite oxide particles have an average composition represented by following Chemical Formula 1:

$$Li_aNi_xCo_yAl_zO_2$$ [Chemical Formula 1]

where, nickel Ni may be substituted with one or more metal elements selected from a group consisting of manganese Mn, chrome Cr, iron Fe, vanadium V, magnesium Mg, titanium Ti, zirconium Zr, niobium Nb, molybdenum Mo, tungsten W, copper Cu, zinc Zn, gallium Ga, indium In, tin Sn, lanthanum La, and cerium Ce within a range of 0.1 or less of nickel Ni assuming that a total amount of nickel Ni is set to 1, and
where, in the Chemical Formula 1, coefficients a, x, y, and z are set to $0.3 \leq a \leq 1.05$, $0.60 < x < 0.90$, $0.10 < y < 0.40$, and $0.01 < z < 0.20$, respectively, and a relationship between x, y and z is set to $x+y+z=1$.

3. The method according to claim 1, wherein the solution is provided on the preheated composite oxide particles to remove the solvent to precipitate the deposition component on surfaces of the composite oxide particles.

4. The method according to claim 1, wherein the deposition component is made of oxoacid salt.

5. The method according to claim 4, wherein the oxoacid salt is ammonium salt.

6. The method according to claim 4, wherein an addition amount of the oxoacid salt is ranged between 0.01 parts by weight and 20 parts by weight with respect to 100 parts by weight of the composite oxide particles.

7. The method according to claim 1, wherein the composite oxide particles with the deposition component are heated within a temperature range between 500° C. and 1200° C. in the heating step.

8. The method according to claim 1, wherein an average particle diameter of the cathode active material is ranged between 2.0 μm and 50 μm.

9. The method according to claim 1, wherein the deposition component is selected from the group consisting of ammonium sulfate and ammonium pentaborate.

10. The method according to claim 1, wherein the composite oxide particles are preheated to a temperature of 120° C.

11. The method according to claim 1, wherein the composite oxide particles have an average composition of $Li_{1.03}Ni_{0.77}Co_{0.20}Al_{0.03}O_2$.

12. The method according to claim 1, wherein the composite oxide particles are preheated before the deposition component is deposited on the composite oxide particles.

13. A method of manufacturing a cathode active material, the method comprising:
providing a solution of a deposition component onto composite oxide particles including lithium Li and nickel Ni;
removing a solvent from the solution on the composite oxide particles within about ten seconds;
precipitating the deposition component on surfaces of the composite oxide particles; and
heating under an oxidation atmosphere the composite oxide particles with the deposition component precipitated on the surfaces.

14. The method according to claim 13, wherein the composite oxide particles have an average composition represented by following Chemical Formula 1:

$$Li_aNi_xCo_yAl_zO_2$$ [Chemical Formula 1]

where, nickel Ni may be substituted with one or more metal elements selected from a group consisting of manganese Mn, chrome Cr, iron Fe, vanadium V, magnesium Mg, titanium Ti, zirconium Zr, niobium Nb, molybdenum Mo, tungsten W, copper Cu, zinc Zn, gallium Ga, indium In, tin Sn, lanthanum La, and cerium Ce within a range of 0.1 or less of nickel Ni assuming that a total amount of nickel Ni is set to 1, and
where, in the Chemical Formula 1, coefficients a, x, y, and z are set to $0.3 \leq a \leq 1.05$, $0.60 < x < 0.90$, $0.10 < y < 0.40$, and $0.01 < z < 0.20$, respectively, and a relationship between x, y and z is set to $x+y+z=1$.

15. The method according to claim 13, wherein the deposition component is made of oxoacid salt.

16. The method according to claim 15, wherein the oxoacid salt is ammonium salt.

17. The method according to claim 15, wherein an addition amount of the oxoacid salt is ranged between 0.01 parts by weight and 20 parts by weight with respect to 100 parts by weight of the composite oxide particles.

18. The method according to claim 13, wherein the composite oxide particles with the deposition component are heated within a temperature range between 500° C. and 1200° C. in the heating step.

19. The method according to claim 13, wherein an average particle diameter of the cathode active material is ranged between 2.0 μm and 50 μm.

20. The method according to claim 13, wherein the solvent is removed by adiabatically compressing a chamber containing the composite oxide particles having the deposited solution.

21. The method according to claim 13, wherein the solvent is removed by drying the composite oxide particles having the deposited solution with a hot air blast.

22. The method according to claim 13, wherein the deposition component is selected from the group consisting of ammonium sulfate and ammonium pentaborate.

* * * * *